Mar. 20, 1923.

R. CLINTON

SPACING TOOL

Filed May 6, 1921

1,448,829

Inventor
Richard Clinton,
By
Attorneys

Patented Mar. 20, 1923.

1,448,329

UNITED STATES PATENT OFFICE.

RICHARD CLINTON, OF PINCKNEY, MICHIGAN, ASSIGNOR TO THE STAR WIRE HANGER COMPANY, OF DETROIT, MICHIGAN.

SPACING TOOL.

Application filed May 6, 1921. Serial No. 467,401.

*To all whom it may concern:*

Be it known that I, RICHARD CLINTON, a citizen of the United States of America, residing at Pinckney, in the county of Livingston and State of Michigan, have invented certain new and useful Improvements in Spacing Tools, of which the following is a specification, reference being had therein to the accompanying drawings.

This invention relates to a tool used for spacing a series of articles at a little distance from each other so that they will be out of contact while being dipped in japan or other liquid coating.

The device is particularly applicable to devices made of wire, such for example as coat hangers. These hangers are made by machinery and it has hitherto been the practice to carry the articles to the dipping frames and space them by hand along the frames.

By the use of the present invention, the articles when lifted from the support at the machine are automatically spaced a suitable distance apart by the action of gravity, and the expenditure of time and labor hitherto required for spacing them is avoided.

Figure 1:
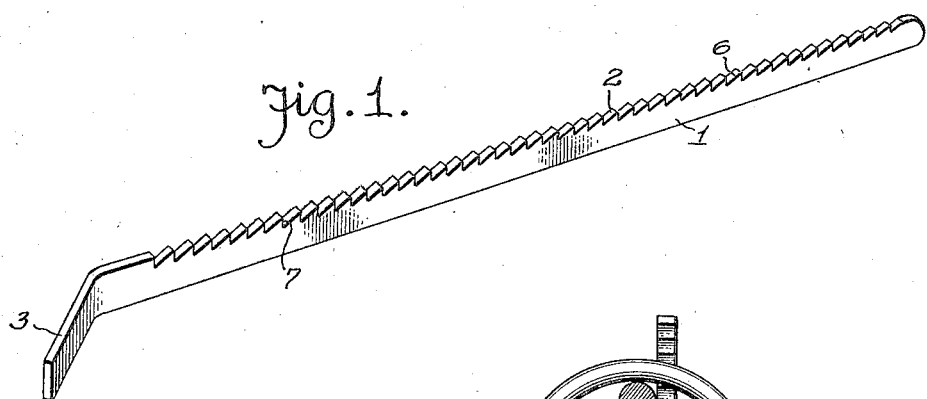
Figure 1 is a perspective view of a preferred form of my invention.
Figure 3:
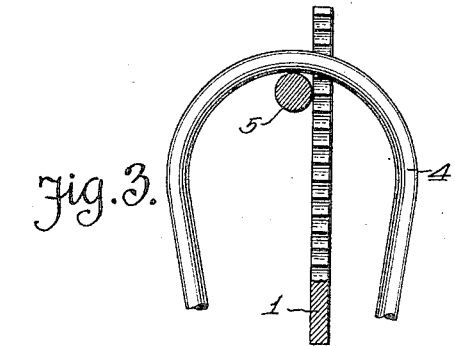
Fig. 3 is an elevation taken at right angles to Fig. 2.
Figure 2:
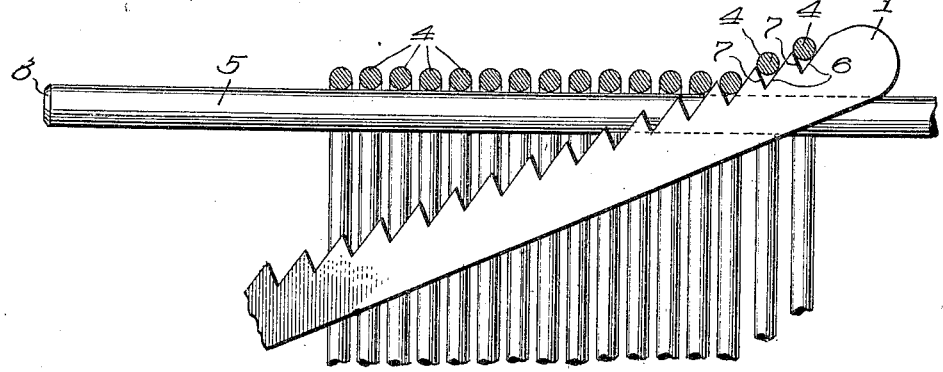
Fig. 2 is a fragmentary elevation, parts being in section illustrating the operation of the spacing device.

The tool consists of a flat bar 1 preferably of steel having one edge formed with a continuous series of regular serrations 2, one end of the bar preferably being bent at an angle to the body as shown at 3 for greater convenience in manipulating the device. The wire articles 4 from the machine are hung upon a support 5 closely adjacent to each other. The bar 1 is thrust beneath the horizontal portions of the articles which engage the support 5 and as the bar 1 is lifted at an angle, as shown in Fig. 2, the serrated edge comes into contact with one of the articles which slips down an inclined side 6 into the bottom of the notch against a side 7 which lies substantially perpendicular to the axis of the bar 1. Continued upward movement of the bar 1 lifts the first article from the support 5 and the second article slips down the side 6 of the second notch until it engages the opposite side 7 and is in turn lifted from the support 5. As the bar 1 is lifted the articles are successively engaged, each slipping into the bottom of a notch, and as the notches are made of a depth just sufficient to receive a single article, each notch will lift a single article so that when all have been engaged and lifted from the support 5 they will be uniformly spaced along the bar 1 and may be removed from the free end 8 of the supporting rod 5.

It will be observed that one side of each notch extends to the adjacent side of the next succeeding notch so that there is no space upon the edge of the bar between notches. Each article must therefore enter a notch. The bar 1 may of course be used as a holder for the articles while they are dipped and while they are dried, but in practice it is preferred to transfer the spaced articles to another support which will hold them while being dipped and while being dried.

The present device is therefore primarily a spacing tool. While simple in structure and operation, its use in a factory in which several million coat hangers are made in a year has resulted in great saving in time and labor.

It is to be understood that this device is susceptible of modification in its form, proportion, details of construction and arrangement of parts to adapt it to variations in the structure of the articles with which it may be used without departure from the principle involved or sacrificing any of its advantages.

It will therefore be understood that the invention is not limited to the specific details shown but that the means and construction herein disclosed describe but one of several modes of putting the invention into effect and the invention is therefore claimed in any of its forms or modifications within the legitimate and valid scope of the appended claims.

I claim:—

1. In the manipulation of articles of similar characteristic, wherein the article includes a configuration of loop or hook shape, and where a plurality of articles are adapted to be assembled on a support common to and extending through the loops or hooks, means for concurrently removing and spacing the assembled articles, said means comprising a tool adapted to be inserted through the loops or hooks of the assembled articles and to be moved in juxtaposition to the support, said tool having its upper edge serrated with the serrations uniformly spaced and with each serration of such dimensions as to receive but a single article, the configuration of each serration being such that movement of the tool longitudinally and upwardly will lift the articles from the support and concurrently assemble them on the tool in definite spaced relation.

2. Means as in claim 1 characterized in that the serrations of the tool each include a wall extending substantially normal to the axis of the tool, such wall of an unoccupied serration being active to limit movement of an article longitudinally of the tool during transfer of the article from the support to the tool.

3. As a means for spacing a series of articles at uniform distances, a bar for supporting the spaced articles and having the upper edge thereof formed with a series of notches uniformly spaced, each notch having dimensions to receive a single article and having one side extending substantially perpendicular to the axis of the bar and having the other side extending from the base of the perpendicular side to the outer end of the perpendicular side of the adjacent notch.

4. As a means for spacing a series of articles having a portion adapted to engage the top of a supporting rod, a bar having a series of notches each of a depth to receive a single article, the sides of each notch extending to the adjacent sides of the contiguous notches whereby when the spacing bar is placed adjacent to the supporting rod and moved longitudinally and upward, successive articles upon the supporting rod will be engaged by successive notches of the spacing bar and lifted from the rod.

In testimony whereof I affix my signature in presence of two witnesses.

RICHARD CLINTON.

Witnesses:
 HENRY C. RUEN,
 ANNA E. MCCLEAR.